United States Patent [19]
Hofmann et al.

[11] Patent Number: 5,978,101
[45] Date of Patent: Nov. 2, 1999

[54] IMAGE DETECTION DEVICE

[75] Inventors: Karl Hofmann, Ulm; Reinhard Oelmaier, Laupheim, both of Germany

[73] Assignee: Temic Telefunken microelectronic GmbH, Heilbronn, Germany

[21] Appl. No.: 08/568,974

[22] Filed: Dec. 7, 1995

[30]     Foreign Application Priority Data

Dec. 9, 1994  [DE]   Germany .............................. 44 43 821

[51] Int. Cl.⁶ .................................................. H04N 1/04
[52] U.S. Cl. ...................... 358/474; 358/482; 250/208.1; 348/295
[58] Field of Search .................................... 358/474, 482, 358/483, 471; 250/208.1, 578.1; 348/294, 295

[56]             References Cited

U.S. PATENT DOCUMENTS

| | | | |
|---|---|---|---|
| 4,779,005 | 10/1988 | Arnold | 348/295 |
| 4,817,123 | 3/1989 | Sones et al. | |
| 4,900,943 | 2/1990 | Marshall et al. | 250/578.1 |
| 5,149,954 | 9/1992 | Pettijohn et al. | 250/208.1 |

FOREIGN PATENT DOCUMENTS

| | | |
|---|---|---|
| 28 32 292 | 2/1980 | Germany . |
| 4231401A1 | 9/1992 | Germany . |
| 4317136C2 | 7/1994 | Germany . |
| 6-90407 | 3/1994 | Japan . |

*Primary Examiner*—Thomas D. Lee
*Attorney, Agent, or Firm*—Spencer & Frank

[57]             ABSTRACT

In an image detection device comprising at least one column arrangement consisting of photo detector elements linearly arranged in a row, an image field will be swung alternately across the photo detector elements in both longitudinal directions of the column arrangement. For time-correct summing and output of the detector signals, the photo detector elements of one column arrangement will be connected with a TDI arrangement. The TDI arrangement features a switch arrangement comprising several switches as well as a memory unit containing several memory cells. By appropriate control of the switch arrangement, its switches will be set such that the detector signals generated in the photo detector elements by one and the same image field pixel will be integrated into one and the same memory cell of the memory unit.

11 Claims, 3 Drawing Sheets

IMAGE DETECTION DEVICE

BACKGROUND OF THE INVENTION

This invention relates to an image detection device of the type comprising at least one column arrangement, consisting of a number of N photo detector elements linearly arranged in a row, for generating detector signals, and a TDI (time delay and integration) arrangement assigned to the photo detector elements for the time-corrected collection and output of the detector signals of an image field alternately swung across the photo detector elements, in both longitudinal directions relative to the column arrangement at the photo detector elements.

An image detection device of this type is known from DE-OS 42 31 401. The image detection device described therein operates according to the principle of scanning an image field by using a swing mirror to swing the image relative to the photo detector elements. By this means, the scene viewed will be successively mapped on to the photo detector elements.

This image detection device features at least one column arrangement complete with photo detector elements arranged in a row in image field swing direction, and a TDI (time delay and integration) arrangement. Whilst the image field is swung across the photo detector elements, a pixel within the image field—an image field section corresponding to the size of the photo detector element—will be successively mapped to the photo detector elements following each other within a row of the column arrangement, causing appropriate detector signals to be emitted. With the TDI arrangement, all detector signals belonging to one and the same image field pixel will be integrated by time-correct summing. The TDI arrangement is designed as a CCD structure which—in order to be able to detect detector signals whilst the swing mirror is swung back into its original position—takes the form of a loop. It is designed such that charges may be shifted in both longitudinal directions.

Due to the use of a CCD structure, however, an image detection device of this type will be very sensitive to radioactive radiation; here, radioactive radiation may cause permanent damage to the CCD structure, which may become evident in a deterioration of its noise behavior.

SUMMARY OF THE INVENTION

The invention provides for an image detection device of the type originally mentioned above, which features a sensitivity to radioactive radiation less than the sensitivity of an image detection device complete with one or several CCD structures, and which features an individual activation/deactivation of single photo detector elements, as well as a simple setup. According to the invention, this task will be achieved by an image detection device comprising at least one column arrangement, consisting of a number of N photo detector elements linearly arranged in a row, for generating detector signals, and a TDI (time delay and integration) arrangement assigned to the photo detector elements for the time-correct collection and output of the detector signals of an image field alternately swung across the photo detector elements, in both longitudinal directions relative to the column arrangement of the photo detector elements, wherein the TDI arrangement features a switch arrangement complete with sever switches controllable by a control unit as well as a memory unit complete with several memory cells, the photo detector elements, which can either by activated or deactivated by the control unit, are connected via a switch arrangement with the memory unit, with each photo detector element being connected with all memory cells of the memory unit via, respectively, at least one switch of the switch arrangement, the control unit switches are driven such that the detector signals respectively generated in the activated photo detector elements by one image field pixel of the image field are respectively integrated into one memory cell of the memory unit. Advantageous further applications and versions of the invention are disclosed and discussed below.

An image detection device according to this invention comprises one or several column arrangements, which shall all be designed in the same way as the one column arrangement described below.

The TDI arrangement of the column arrangement features a memory unit comprising several memory cells, as well as a switch arrangement by means of which the photo detector elements of the column arrangement will be connected to the memory cells of the memory unit. The switch arrangement, driven by a control unit, is to provide for activation or deactivation of these photo detector elements; here, photo detector elements will be activated, if they are electroconductively connected with the memory unit, and deactivated, if there is no electroconductive connection with any of the memory cells. The switch arrangement furthermore provides for time-correct passing on of detector signals to the relevant memory cells within the memory unit. The detector signals generated, respectively, by one and the same image field pixel of the image field in the activated photo detector elements will respectively be integrated into one of the memory cells of the memory unit.

The switch arrangement preferably comprises one switchover unit, driven by a control unit, as well as a subsequent switch matrix also driven by the same control unit.

For each photo detector element of the column arrangement, the switchover unit provides an input as well as an output terminal. Preferably, the input terminals are respectively connected—via a coupling device each and in accordance with their actual sequence—with one of the photo detector elements arranged in a row.

By means of the switchover unit, each one of the photo detector elements can either be activated or deactivated. Here, for an activated photo detector element, the relevant input terminal of the switchover unit connected to that photo detector element will be connected electroconductively, either via a so-called straight connection or via a so-called cross-over connection, with one of the output terminals of the switchover unit; for a straight connection, the relevant input terminal will be electroconductively connected with the output terminal assigned according to the relevant actual sequence—that is, for input and output terminals consecutively numbered from $k=1, 2, \ldots, N$, the relevant input terminal k will be connected to the output terminal k; and for a cross-over connection, the relevant input terminal will be electroconductively connected with an output terminal assigned according to the relevant reverse sequence—that is, the relevant input terminal k will be connected to the output terminal $N+1-k$. Preferably, not all photo detector elements will be activated for image detection; defective or low quality photo detector elements will be deactivated during image detection in order to suppress any defective or degraded detector signals, which these defective or low quality photo detector elements may cause. During image detection, the photo detector elements to be activated will be connected—by means of the relevant input terminals of the switchover unit, depending on the swing direction of the image field across the column arrangement, via either straight or cross-over connections,—with the respective output terminals of the switchover unit. When the image field is swung forward, that is, during the time in which the image field is swung across the photo detector elements in one of the two longitudinal directions of the column arrangement, the activated photo detector elements will be connected by means of one straight connection respectively with the respective output terminal of the switchover unit; when the image field is swung backwards, that is, during the time in which the image field is swung across the detector elements in the other longitudinal direction of the column arrangement, the activated photo detector elements will be connected by means of one cross-over connection respectively with the respective output terminals of the switchover unit. In this way, the detector signals originated sequentially by an image field pixel whilst the image field is swung across the column arrangement will be passed in sequence to the respective output terminals of the switchover unit; however, the actual sequence of these detector signals output one after the other at different times on different output terminals will be independent of image field swing direction.

Via the switch matrix, the detector signals passed on to the output terminals of the switchover unit will be further transmitted to the memory cells of the memory unit. The switch matrix will be driven by the control unit such that the detector signals originated sequentially by one and the same image field pixel in the activated photo detector elements will be integrated into one and the same memory cell.

As all activated photo detector elements simultaneously generate detector signals which are assigned to different image field pixels, and as each of these detector signals is to be capable of evaluation, the number of memory cells provided in the memory unit must be at least equal to the number of photo detector elements activated during image detection; preferably, this number is greater by an integral multiple, as this will allow intermediate scans to be made, that is, one each of the activated photo detector elements respectively generates detector signals succeeding each other in time, which detector signals are originated by successive overlapping image field pixels.

The swing back time of the image field can be used for image detection without any significant additional control requirements for the column arrangement being necessary, as—due to the switchover unit used—switch matrix control will be independent of the actual swing direction of the image field. Therefore, as CCD structures will not be required, and as the TDI arrangement is less sensitive to radioactive radiation than a TDI arrangement designed as a CCD structure, the image detection device according to this invention will also be suitable for use in environments contaminated by radioactive radiation. Moreover, the system characteristics of the image detection device can be improved by means of the deactivation of defective or low quality photo detector elements, as in this way the variation in the electrical characteristics of the remaining photo detector elements activated for image detection will be reduced.

BRIEF DESCRIPTION OF THE DRAWINGS

Below, the invention will be further described using the following figures, wherein.

DESCRIPTION OF THE PREFERRED EMBODIMENTS

Figure 1:
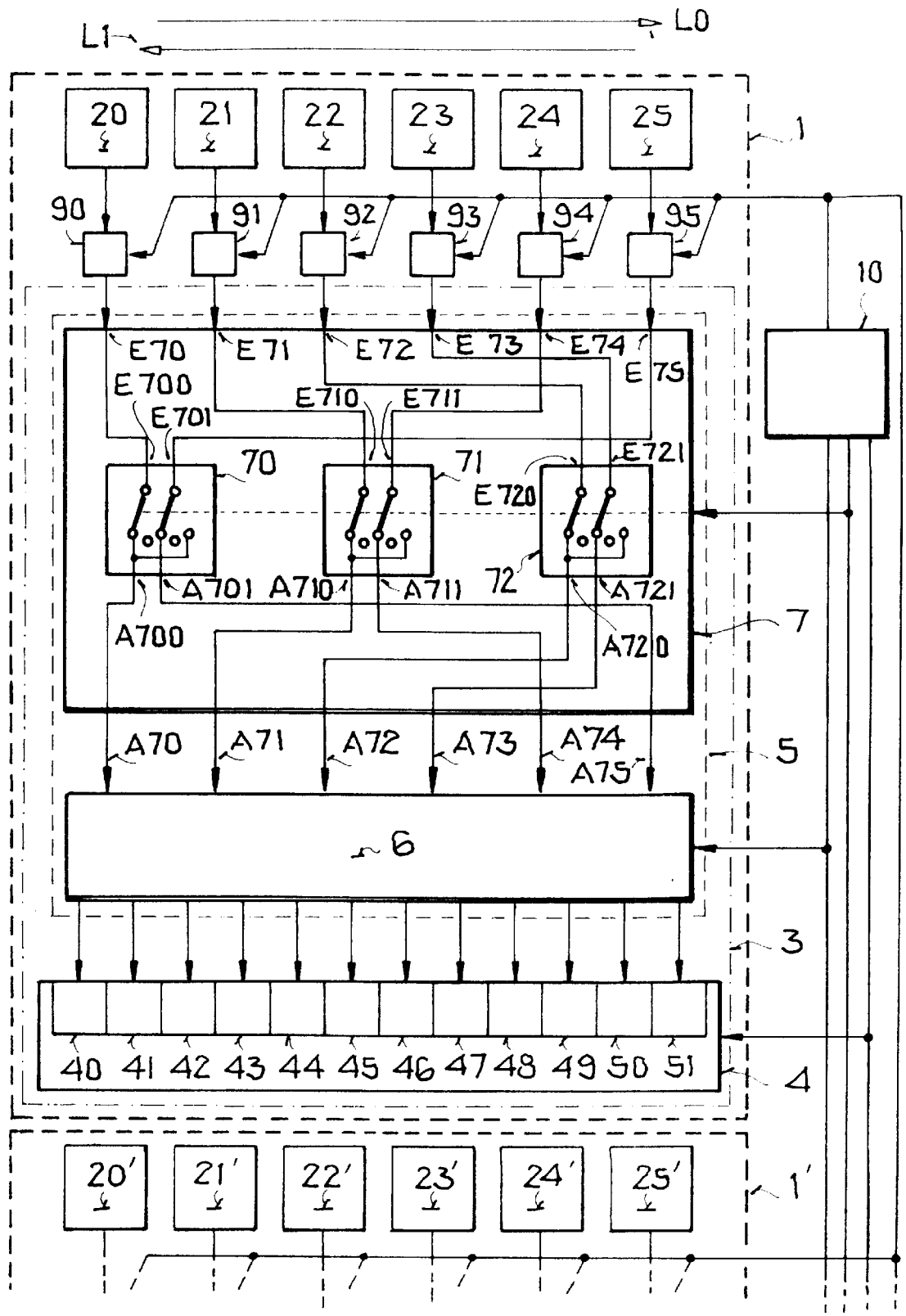
FIG. 1 is a basic circuit diagram of an embodiment of the image detection device according to this invention.

The embodiment of the image detection device described in the above-mentioned Figures is equipped with several photo detector elements of the same type, which are arranged in a two-dimensional detector matrix. This detector matrix, designed as an integrated circuit, features several detector columns and several detector rows. In FIG. 1, which shows an embodiment complete with an N=6 detector matrix, that is with N=6 photo detector elements in each detector column, only the first and second detector columns have been drawn. Here, the photo detector elements of column arrangement 1, designated in FIG. 1 as 20 . . . 25, will form the first detector column, the photo detector elements 20' . . . 25' of column arrangement 1' will form the second detector column within the detector matrix. Column arrangement 1' merely indicated here, and further column arrangements not shown in FIG. 1, will be implemented in the same way as column arrangement 1 described in detail below.

In addition to the photo detector elements 20 . . . 25, column arrangement 1 comprises TDI arrangement 3 and coupling stages 90 . . . 95. The photo detector elements 20 . . . 25 will respectively be connected via one each of the coupling stages 90 . . . 95 with TDI arrangement 3. This TDI arrangement 3 features a switch arrangement 5 complete with a switchover unit 7 and a subsequent switch matrix 6 as well as a memory arrangement 4, connected with this switch matrix 6, comprising memory cells 40 . . . 51. The input terminals E70 . . . E75 of switchover unit 7 are connected sequentially, via the respective coupling stages 90 . . . 95, with photo detector elements 20 . . . 25, that is, the k-th input terminal E70 or . . . or E75 will be connected via the k-th coupling stage 90 or . . . or 95 with the k-th photo detector element 20 or . . . or 25, with k=1, 2, . . . , 6 providing a continuous numbering of input terminals E70 . . . E75, output terminals A70 . . . A75, coupling stages 90 . . . 95, and photo detector elements 20 . . . 25 of column arrangement 1 as well as the detector rows within the detector matrix. The output terminals A70 . . . A75 of switchover unit 7 will be respectively connected with one input terminal each of switch matrix 6. This switch matrix 6 features twelve output terminals, each respectively connected with one of the memory cells 40 . . . 51.

Switchover unit 7 can be driven by means of control unit 10 such that some of its input terminals E70 . . . E75 will be electroconductively connected, respectively, with one of its output terminals A70 . . . A75, such a connection being made either as a straight connection or as a cross-over connection. For a straight connection, the input terminal to be connected E70 or . . . or E75 will be electroconductively connected with the output terminal A70 or . . . or A75 assigned to that input terminal according to the relevant sequence; that is, only the k-th input terminal E70 or . . . or E75 can be electroconductively connected with the k-th output terminal A70 or . . . or A75. For a cross-over connection, however, the input terminal to be connected E70 or . . . or E75 will be electroconductively connected with output terminal A75 or . . . or A70 of switchover unit 7, where the relevant output terminal will have been assigned to the relevant input terminal according to the reverse sequence; that is, only the k-th input terminal E70 or . . . or E75 can be electroconductively connected with the l-th output terminal A75 or . . . or A70, where for 6 photo detector elements per column arrangement l=6+1−k shall be true.

Input terminals E70 . . . E75 and output terminals A70 . . . A75 of switchover unit 7 may be interconnected into input pairs E70, E75, or E71, E74, or E72, E73, or output pairs A70, A75, or A71, A74, or A72, A73, where—respectively—the k-th input terminal E70, or E71, or E72, together with the l-th input terminal E75, or E74, or E73 will form the input pair E70, E75, or E71, E74, or E72, E73, and where the k-th output terminal A70, or A71, or A72, together with the l-th output terminal A75, or A74, or A73 will form the corresponding output pair A70, A75, or A71, A74, or A72, A73. For each of the input pairs E70, E75, or E71, E74, or E72, E73, the switchover unit 7 will provide a switching device 70, or 71, or 72, complete with two switching inputs each, E700, E701, or E710, E711, or E720, E721, and with two switching outputs each, A700, A701, or A710, A711, or A720, A721. The input pairs E70, E75, or E71, E74, or E72, E73 will be connected via switching devices 70, or 71, or 72 with the relevant output pairs A70, A75, or A71, A74, or A72, A73; here, the input terminals E70, or E75, or E71, or E74, or E72, or E73, of an input pair will each be connected to a switching input E700, or E701, or E710, or E711, or E720, or E721, of the respective switching device 70, or 71, or 72, and the output terminals A70, or A75, or A71, or A74, or A72, or A73, of the relevant output pair will each be connected to a switching output A700, or A701, or A710, or A711, or A720, or A721, of the respective switching device 70, or 71, or 72.

Figure 2:
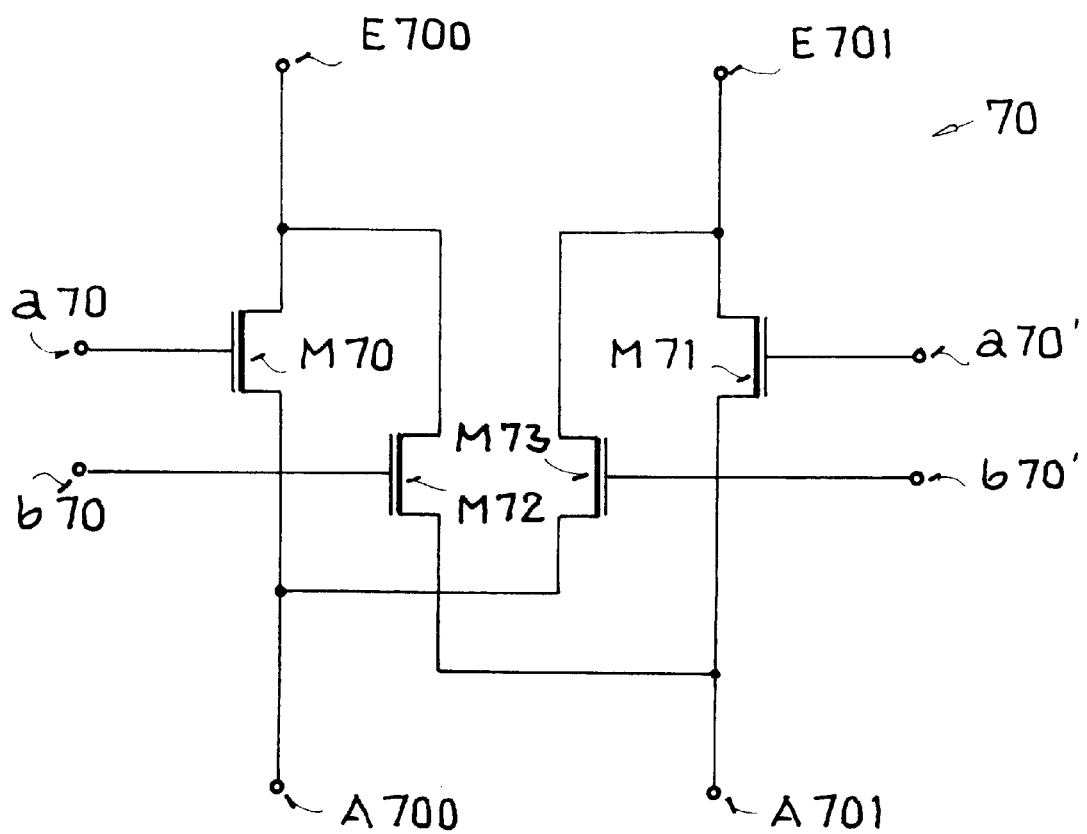
FIG. 2 shows an embodiment of a switching device for the image detection device from FIG. 1.

As an embodiment, FIG. 2 shows the circuit diagram for the first switching device 70; the other switching devices 70, 71 are constructed in the same way. This switching device 70 is equipped with four MOS transistors M70 . . . M73 operated as switching transistors. The source terminals of the first and third MOS transistors M70, or M72, will be connected with the first switching input E700 of switching device 70; the source terminals of the second and fourth MOS transistors M71, or M73, will be connected with the second switching input E701 of switching device 70; the drain terminals of the first and fourth MOS transistors M70, or M73, will be connected with the first switching output A700, and the drain terminals of the second and third MOS transistors M71, or M72, will be connected with the second switching output A701 of switching device 70. The gate terminals of MOS transistors M70, or M71, or M72, or M73, provide the control terminals a70, or a70' , or b70, or b70' , of switching device 70. They can be driven via control unit 10. The control terminals a70 and b70, or a70' and b70' , will be push-pull driven in order to activate the photo detector element 20, or 25, connected with the respective switching input E700, or E701. In a straight connection from switching input E700, or E701, to the respective switching output A700, or A701, the first MOS transistor M70, or the second MOS transistor M71, will be in an electrically conductive condition, and the other two MOS transistors M72, and M73, will be in inhibited condition. In a cross-over connection, however, the third MOS transistor M72, or the fourth MOS transistor M73, will be in an electrically conductive state and the other two in an inhibited state. If the first and third MOS transistors M70, and M72, or the second and fourth MOS transistors M71, and M73, are inhibited, then the photo detector element 20, or 25, connected with the relevant switching input E700, or E701, will be deactivated.

Figure 3:
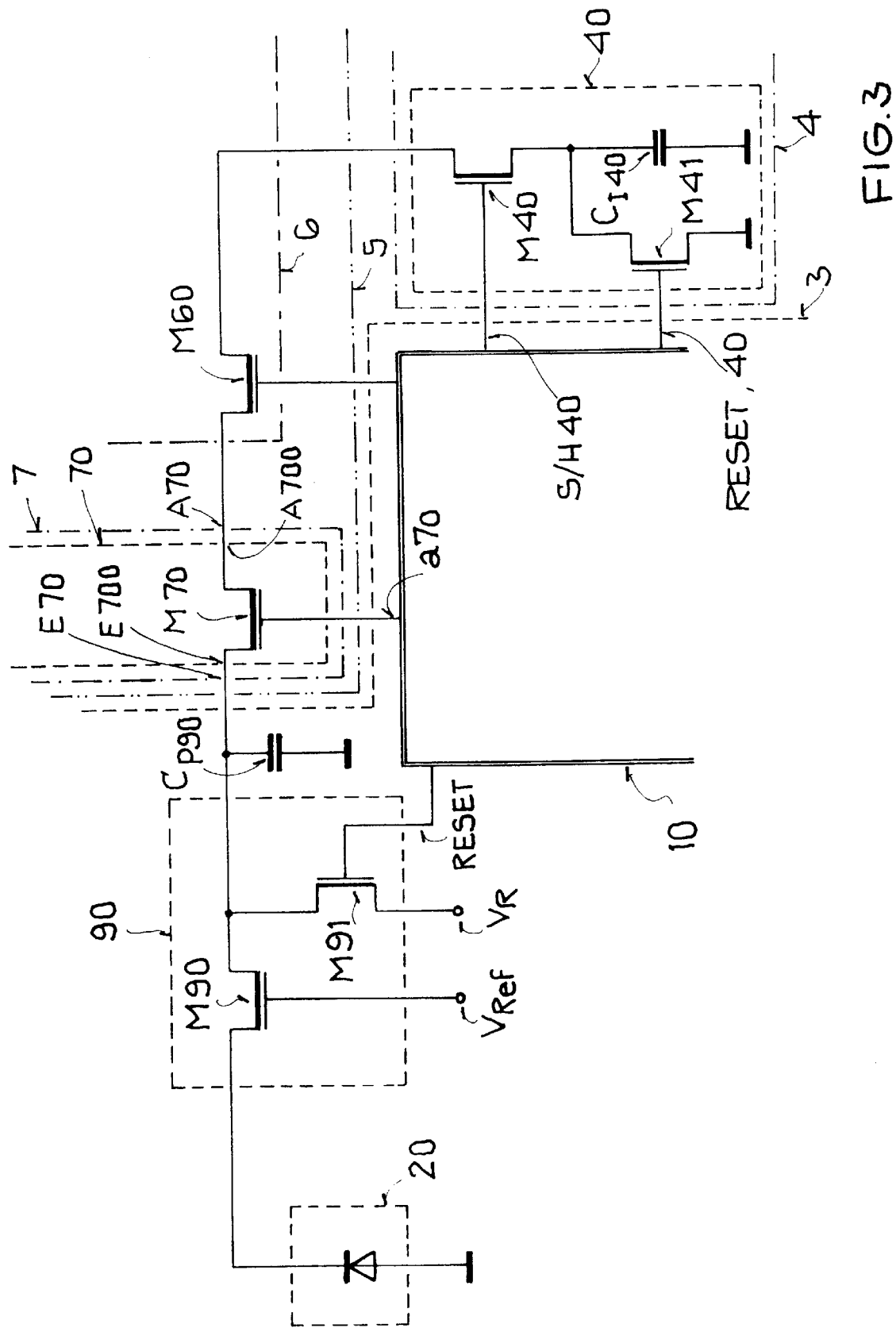
FIG. 3 is a partial circuit diagram of the embodiment of an image detection device according to FIG. 1.

The partial circuit diagram shown in FIG. 3 illustrates the signal path from the first photo detector element 20 to the first memory cell 40. All other signal paths not shown in this Figure, going from photo detector elements 20 . . . 25 to memory cells 40 . . . 51, will be implemented in the same way.

Photo detector element 20 is implemented as a CMT (cadmium mercury telluride) diode. As this diode is -Averse biased, and as its reverse voltage of typically 30—50 mV may not be exceeded, it will be connected via coupling stage 90 with TDI arrangement 3.

This coupling stage 90 features a coupling transistor M90 implemented as an MOS transistor, whose source terminal will be directly connected with photo detector element 20, and whose drain terminal is connected with the input terminal E70 of switchover unit 7. Via reference voltage source VRef connected with the gate terminal of coupling transistor M90, the constant portion of the voltage on photo detector element 20, i.e. its operating point, will be set. This coupling stage 90 further provides a reset transistor M91, also implemented as an MOS transistor, for discharging parasitic capacity designated as $C_{p90}$, the source terminal of which reset transistor M91 will be connected with the drain terminal of coupling transistor M90, whose drain terminal will be connected with the reset voltage source $V_R$ and whose gate terminal can be driven via a reset potential provided by the control unit on reset line RESET. The coupling stages 90 . . . 95 will all be implemented in the same way. Their coupling transistors, and/or reset transistors, will all be connected with the same reference voltage source $V_{Ref}$ or reset voltage source $V_R$, located for example in control unit 10. The gate terminals of their reset transistors will all be connected with the same reset line RESET.

Along the drawn signal path, integration capacitor $C_{140}$ of memory element 40 provides for the integration of the charges supplied by photo detector element 20—i.e. for the integration of the detector signals. Via scanning hold switch M40, implemented as an MOS transistor, this capacitor will be connected with a switch matrix output for driving the charging process. The integration capacitor $C_{140}$ can be discharged by means of the memory reset transistor M41, which will also be implemented as an MOS transistor. The gate terminal of scanning hold switch M40 can be driven by control unit 10, via scanning hold line S/H40. The memory reset transistor M41 can be switched on and off by means of the memory reset line RESET40, which is connected with control unit 10. All memory cells 40 . . . 51 of memory unit 4 will be implemented in the same way. Each one of these memory cells 40 . . . 51 can be individually driven by control unit 10, via their own memory reset line designed similarly to memory reset line RESET40. Memory cells 40 . . . 51 will be interconnected into memory groups, with the number of memory cells within any one memory group being at least equal to the number of photo detector elements to be activated during image detection; each one of these memory groups can be driven by control unit 10 via their own scanning hold line implemented similarly to scanning hold line S/H40. M70 or M60 shall designate the MOS transistors of switchover unit 7, or switch matrix 6, which transistors will be located in the signal path between the first photo detector element 20 and the first memory cell 40. The gate terminals of these transistors can also be driven by control unit 10.

For image detection, an image field will be swung backwards and forwards across the detector matrix in column direction, that is, across photo detector elements 20 . . . 25, 20' . . . 25' of column arrangements 1, 1' in the longitudinal directions L0, L1 marked by arrows. Each image field pixel mapped on to an activated photo detector element generates in this photo detector element a photoelectric current, thus providing a detector signal, that is, charges which will be detected by the relevant TDI arrangement. The detector signals of all activated photo detector elements from a detector row within the detector matrix will be detected simultaneously. To this end, the memory units of the column arrangements will be driven in the same way, and the switch matrices of the column arrangements will also be driven in the same way. Below, the detection of detector signals for column arrangement 1 only will be described, as the same description applies also to all other column arrangements.

For image detection, all or only a few of the photo detector elements 20 . . . 25 may be activated. To improve image quality, the two photo detector elements showing the poorest electrical characteristics will be deactivated (in this present example). In this way, the variation of sensitivity and noise behavior of the remaining photo detector elements activated for image detection will be reduced. In the following, it shall be assumed that photo detector elements 20 . . . 23 feature the best electrical characteristics. Thus, for image detection, photo detector elements 20 . . . 23 will be activated, and the image field pixels (of the image field) mapped on to these photo detector elements 20 . . . 23 will be scanned, that is, for a time interval to be set the charges generated in these photo detector elements 20 . . . 23 will be integrated into one each of memory cells 40 . . . 51 in memory unit 4; this is done by closing the scanning hold switch of the respective memory cell during this particular time interval only. The charges generated by one and the same image field pixel within the activated photo detector elements 20 . . . 23 will be integrated, respectively, into one and the same memory cell by appropriate control of switchover unit 7 and switch matrix 6. Thus, for instance, whilst the image field is swung in forward direction, i.e. in longitudinal direction L0, a first image field pixel will be sequentially mapped on to photo detector elements 20 . . . 25. The input terminals E70 . . . E73 of switchover unit 7, connected with the activated photo detector elements 20 . . . 23, and the respective output terminals A70 . . . A73 of switchover unit 7 will be respectively connected by means of a straight connection. The charges generated by the first image field pixel in the activated photo detector elements 20 . . . 23 will thus be respectively applied in a time sequence to one of the output terminals A70 . . . A73 of switchover unit 7. By appropriate control of switch matrix 6, these charges will be integrated one after the other, for instance into the first memory cell 40. During the time interval within which the image field is swung in reverse direction, that is, in longitudinal direction L1, input terminals E70 . . . E73 of switchover unit 7, connected with the activated photo detector elements 20 . . . 23, and the respective output terminals A70 . . . A73 of switchover unit 7 will be respectively connected by means of a cross-over connection. It is thus not possible to detect the swing direction of the image field by means of the charges supplied to the output terminals A70 . . . A73 of switchover unit 7. It follows that the control cycle for driving switch matrix 6 and memory unit 4 will be the same for both swing directions of the image field.

In the event of all six photo detector elements 20 . . . 25 being activated, at least six memory cells will be required for signal detection, as the simultaneously generated charges by these six photo detector elements 20 . . . 25 will be effected by six different image field pixels. However, as in the present example only four photo detector elements will be activated, four memory cells would be sufficient for signal detection. To improve image quality, a triple intermediate scan will be carried out, that is, in the time interval, within which an image field pixel will be swung from one photo detector element to the next photo detector element, three scans will be carried out. In consequence, three memory cells will be required to evaluate the signals for each activated photo detector element. Thus, three memory groups comprising 4 memory cells each, i.e. a total of 12 memory cells 40 . . . 51, will be required.

In order to suppress crosstalk, before each scanning process the parasitic capacities on input lines E70 . . . E75 of switchover unit 7 will be charged—via the reset transistors of coupling stages 90 . . . 95—to a potential defined by the reset voltage source $V_R$. Memory cells 40 . . . 51 will only be reset after integration of the charges generated by one image field pixel in all activated photo detector elements. Before such a reset, the charges stored in the integration capacitors for image reconstruction will be detected by an evaluation unit of the image detection device.

The present example shows an image detection device with an even number of photo detector elements 20 . . . 25. However, devices with odd numbers of photo detector elements are also quite conceivable. The central photo detector element will then be connected with switch matrix 6 either directly, or, if it is to be capable of being deactivated, by means of a simple switching element provided in switchover unit 7—an MOS transistor capable of being driven by control unit 10, for instance.

What is claimed is:

1. An image detection device comprising at least one column arrangement, consisting of a number of N photo detector elements linearly arranged in a row, for generating detector signals, and a TDI (time delay and integration) arrangement assigned to the photo detector elements for the time-correct collection and output of the detector signals of an image field alternately swung across the photo detector elements, in both longitudinal directions relative to the column arrangement of the photo detector elements, and wherein the TDI arrangement features a switch arrangement complete with several switches controllable by a control unit as well as a memory unit complete with several memory cells, the photo detector elements, which can either be activated or deactivated by the control unit, are connected via a switch arrangement with the memory unit, with each photo detector element being connected with all memory cells of the memory unit via, respectively, at least one switch of the switch arrangement, the control unit switches are driven such that the detector signals respectively generated in the activated photo detector elements by one image field pixel of the image field are respectively integrated into one memory cell of the memory unit, the switch arrangement for time-correct passing on of detector signals to the memory cells in the memory unit features one switchover unit connected with the photo detector elements and driven by the control unit, as well as a switch matrix also driven by the control unit, by means of which switch matrix the switchover unit is connected with the memory cells in the memory unit, the switchover unit features a number of N input terminals respectively connected with one of the photo detector elements of the column arrangement, as provided for by their sequence, and a number of N output terminals respectively connected with one input terminal of the switch matrix, for an activated photo detector element, the input terminal of the switchover unit—which input terminal is connected with this activated photo detector element—is electroconductively connected either with an output terminal of the switchover unit, assigned according to the reverse sequence, and for a deactivated photo detector element, the input terminal of the switchover unit—which input terminal is connected with this deactivated photo detector element—is not electronductively connected with any of the output terminals of the switchover unit.

2. Device according to claim 1 wherein for passing on detector signals to the switch matrix, at least some of the photo detector elements will be activated, and wherein, for an image field swung in a longitudinal direction across the photo detector elements of the column arrangement, the input terminals of the switchover unit connected with the activated photo detector elements will be respectively connected with the output terminals of the switchover unit, which have been assigned to each other according to the normal sequence, and wherein, for an image field swung in the other longitudinal direction across the photo detector elements of the column arrangement, the input terminals of the switchover unit connected with the activated photo detector elements will be respectively connected with the output terminals of the switchover unit, which have been assigned to each other according to the reverse sequence, and wherein the number of memory cells in the memory unit is at least equal to the number of photo detector elements activated during image detection.

3. Device according to claim 1, wherein the switch matrix can be controlled such that each one of its input terminals can be electroconductively connected with each one of the memory cells in the memory unit.

4. Device according to claim 1, wherein in each column arrangement a specifiable number of photo detector elements is deactivated.

5. Device according to claim 1, wherein respectively, one input terminal of the switchover unit and the input terminal (of the switch over unit) assigned to it according to the reverse sequence—if these are different input terminals—form an input pair, to one respective input pair, a corresponding output pair consisting of two output terminals of the switchover unit is assigned such that the input terminals of the relevant input pair and the output terminals of the relevant output pair are assigned to each other according to their sequence, respectively, one switching device driven by the control unit, which switching device features two input terminals each and two output terminals each, will be assigned to each input pair, via the respective switching devices, the input pairs are connected with the corresponding output pairs.

6. Device according to claim 5 wherein each switching device of the switchover unit comprises four MOS transistors, with the source terminal of the first MOS transistor, the source terminal of the third MOS transistor, and the first input terminals of the relevant switching device being connected to each other, the source terminal of the second MOS transistor, the source terminal of the fourth MOS transistor, and the second input terminals of the relevant switching device being connected to each other, the drain terminal of the first MOS transistor, the drain terminal of the fourth MOS transistor, and the first output terminals of the relevant switching device being connected to each other, the drain terminal of the second MOS transistor, the drain terminal of the third MOS transistor, and the second output terminals of the relevant switching device being connected to each other, and the gate terminals of the MOS transistors forming the control terminals of the respective switching device, capable of being driven by the control unit.

7. Device according to claim 1 wherein, via a coupling stage each, the photo detector elements are connected with the respective input terminal of the switchover unit.

8. Device according to claim 7 wherein each coupling stage features a coupling transistor, implemented as an MOS transistor, for setting the operating point of the respective photo detector element, and where the source terminal of this coupling transistor is connected with the respective photo detector element, the drain terminal with the respective input terminal of the switchover unit, and the gate terminal with a reference voltage source.

9. Device according to claim 8 wherein each coupling stage features a reset transistor, implemented as an MOS transistor, whose gate terminal can be driven by means of a reset line connected with the control unit, whose source terminal is connected with the drain terminal of the coupling transistor, and whose drain terminal is connected with a reset voltage source.

10. Device according to claim 1 wherein each memory cell in the memory unit features an integration capacitor which is capable of being charged by means of a scanning hold switch of the respective memory cell, which scanning hold switch is implemented as an MOS transistor; and this integration capacitor can be reset to a specifiable potential by means of a memory reset transistor, also implemented as an MOS transistor.

11. Device according to claim 1 wherein the number of memory cells provided in the memory unit is greater by an integral multiple than the number of photo detector elements activated during image detection.

* * * * *